UNITED STATES PATENT OFFICE.

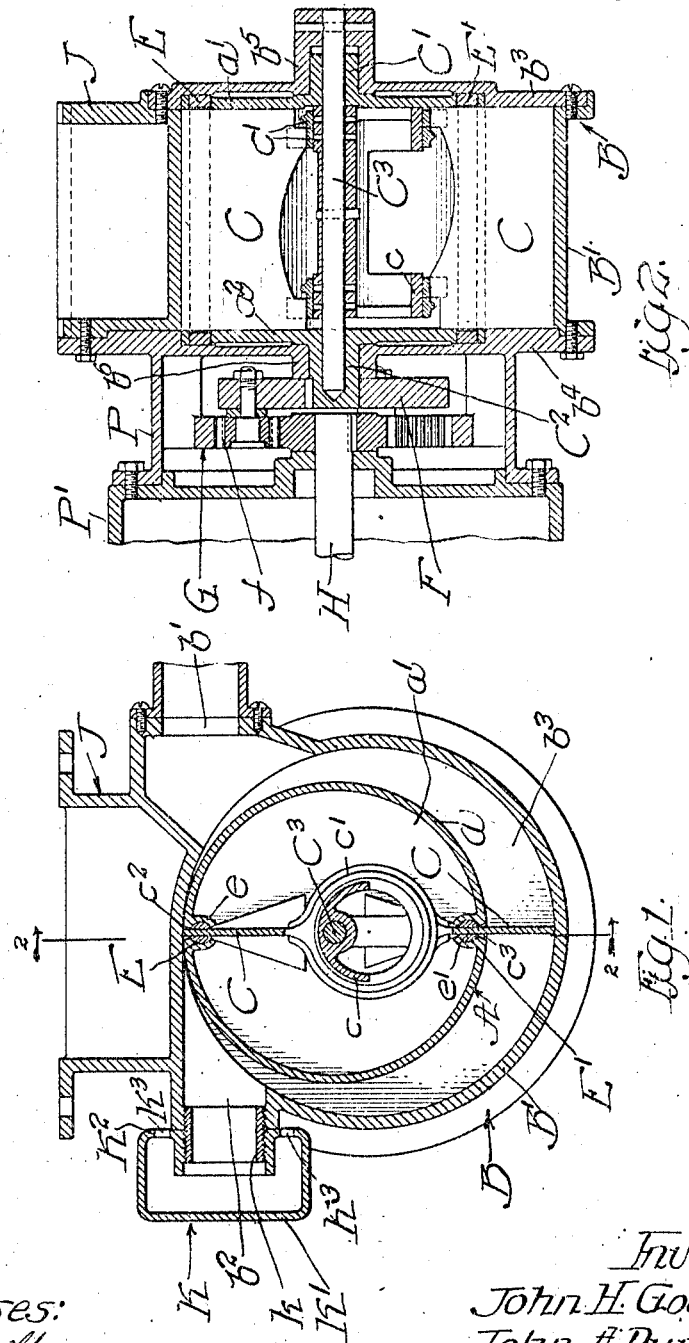

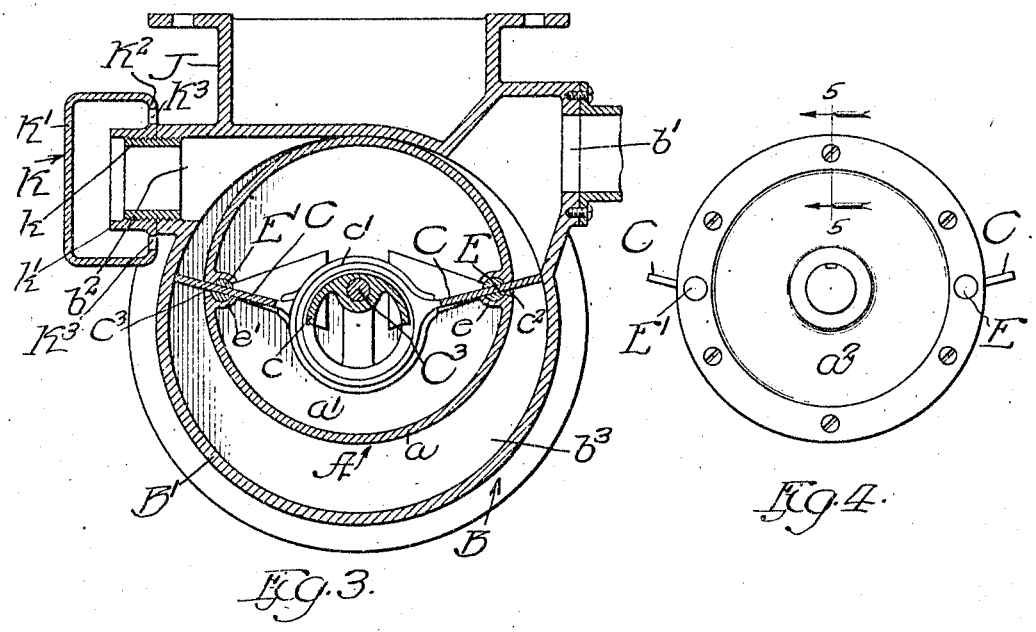
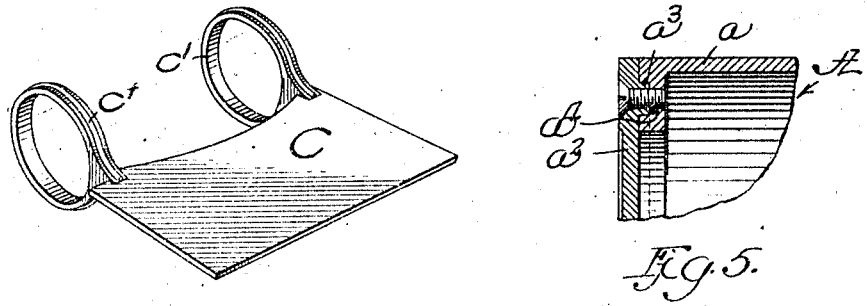
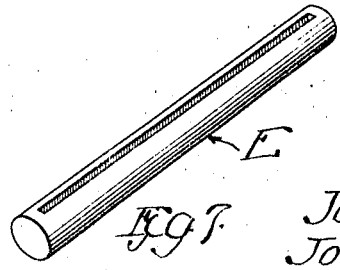

JOHN H. GOEHST AND JOHN A. DUNLAP, OF CHICAGO, ILLINOIS, ASSIGNORS TO FEDERAL ELECTRIC COMPANY, OF CHICAGO, ILLINOIS, A CORPORATION OF ILLINOIS.

SUCTION-PRODUCING DEVICE.

993,053.      Specification of Letters Patent.      Patented May 23, 1911.

Application filed September 7, 1909. Serial No. 516,584.

*To all whom it may concern:*

Be it known that we, JOHN H. GOEHST and JOHN A. DUNLAP, citizens of the United States, and residents of Chicago, in the county of Cook and State of Illinois, have invented certain new and useful Improvements in Suction-Producing Devices; and we do hereby declare that the following is a full, clear, and exact description thereof, reference being had to the accompanying drawings, and to the letters of reference marked thereon, which form a part of this specification.

This invention relates to a rotary suction pump and comprises the matters hereinafter described and more particularly pointed out in the appended claims.

The pump is particularly adaptable for use in vacuum cleaning devices and is highly efficient in producing the required vacuum for the operation of such a device with an expenditure of a minimum amount of energy. It is of simple and economical construction; is practically noiseless in running; and may be readily taken apart for renewal or for repair of parts.

The various advantages will appear more clearly as we proceed with our specification.

In the drawings:—Figure 1 is a transverse, cross-section through the pump on a plane through the axis of the entrance and discharge orifices of the pump. Fig. 2 is a vertical section through Fig. 1 on the line 2—2 thereof. Fig. 3 is a cross-section similar to Fig. 1 with the blades in a different position from that illustrated in Fig. 1. Fig. 4 is an end elevation of the blade carrying drum. Fig. 5 is a partial vertical section through Fig. 4 on the line 5—5 thereof. Fig. 6 is a perspective view of one of the blades showing the rings by means of which it is mounted. Fig. 7 is a perspective view of one of the rods which support the blades in their operation.

The pump comprises inner and outer drums eccentrically arranged, the outer surface of the inner drum having a line of contact with the inner surface of the outer drum on opposite sides of which line are located the entrance and discharge orifices. Said orifices communicate with the chamber formed between the drums. Fans or blades, arranged radially of the outer drum, are carried by the inner drum and are adapted to swing through the chamber between said drums and push the air or other fluid in the pump from the entrance orifice toward and out of the discharge orifice. In operation the blades or fans have a compressive action on the air between them so as to more forcibly drive the air through the discharge orifice.

In the drawings, A represents the inner drum, B the outer drum, and C C a pair of oppositely disposed blades or fans carried by the inner drum and adapted to sweep through the space between the inner and outer drums. The drum A consists of a cylindrical shell $a$ closed at one end by a head $a^1$, preferably made integral therewith, and at its opposite end with a head $a^2$ removably secured to the end of the cylindric shell. As illustrated in the drawings, said removable head $a^2$ is provided with an annular shoulder or rib $a^3$ which engages in an annular groove cut in the face of a flange $a^4$ formed at the end of the cylindric shell $a$. Hubs $C^1$ $C^2$ are formed on the outer faces of the heads $a^1$ $a^2$, respectively, and a shaft $C^3$ is rotatably mounted in said hubs. Within the drum A is located a cylindric cam $c$ which is keyed to the shaft $C^3$ with its axis coincident with the axis of the outer drum B. The blades C C are operatively mounted on said cam by means of rings $c^1$ $c^1$ which are preferably made integral therewith. The cam and the said rings are so constructed relatively to each other and to the position of the shaft $C^3$ that the said blades or fans C C, in their operation, will revolve about the axis of the drum B as a center. Said fans or blades project through slots $c^2$ $c^3$ formed in the cylindric surface of the drum A and also through slotted rods E $E^1$ which are rotatively mounted in diametrically opposed bearings $e$ $e^1$ preferably formed integral with the cylindric walls of the drum A.

The outer drum B comprises a cylindric shell $B^1$ having formed integrally therewith an entrance orifice $b^1$ and discharge orifice $b^2$ and is closed at its opposite ends by means of plates $b^3$ $b^4$. The upper part of said drum is provided with a supporting bracket J which is preferably formed integral therewith.

$b^5$ $b^6$ indicate eccentrically disposed hubs formed on the end plates $b^3$ $b^4$ within which are respectively journaled the hubs $C^1$ $C^2$ of the inner drum A. In addition the ends of the drum A have bearing within annular depressions formed on the inner faces of said end plates $b^3$ $b^4$. The shaft $C^3$ is rigidly secured within the hub $b^5$. The hub $C^2$ of the inner drum projects beyond the hub $b^6$ of the outer drum and is there provided with a disk F to which are rotatably attached gears $f$ forming part of a planetary system of gearing G operatively connected with a driving shaft H. The driving shaft H may be driven by an electric motor or in any other convenient manner.

K indicates a muffler which is secured to the discharge orifice $b^2$, in any convenient manner, as for example by means of the threaded thimble $k$. Said muffler consists of an inclosed drum of larger diameter than the discharge orifice, provided with a head $K^1$, against which the discharge is directed, an inwardly turned flange $K^2$ provided with openings $K^3$ for the escape of the discharged air, and an internally disposed annular nipple $k^1$ which serves for the attachment of the muffler. Said muffler is of simple construction and is quite efficient in preventing any puffing noise in the action of the pump.

The end plate $b^4$ is preferably provided with an annular flange P which is adapted to inclose the planetary gearing and which may be secured to the casing $P^1$ inclosing the motor, which drives the shaft H.

We claim as our invention:—

1. In a suction pump of the class described, in combination with an outer fixed drum, an inner rotatable drum eccentrically journaled within said outer drum and separated therefrom by a chamber, entrance and discharge orifices communicating with said chamber, a shaft keyed to the outer drum with its axis coincident with the axis of rotation of the inner drum, a cam member secured to said shaft within said inner drum, said cam member having longitudinally spaced bearing rings concentric with said outer drum, oppositely disposed blades carried by said inner drum, said blades projecting through the cylindric walls of said inner drum and engaging the inner walls of said outer drum, longitudinally spaced rings secured to said blades, each ring of one blade being mounted on one of said bearing rings and being located adjacent a ring of the opposite blade, and means for rotating said inner drum.

2. In a suction pump of the class described, in combination with an outer fixed drum, an inner rotatable drum eccentrically journaled within said outer drum and separated therefrom by a chamber, said inner drum comprising a cylindric shell, an integral head closing one end of said shell and a removable head closing the other end of said shell, entrance and discharge orifices communicating with said chamber, a shaft keyed to the outer drum with its axis coincident with the axis of rotation of the inner drum, a cam member secured to said shaft within said inner drum, said cam member having longitudinally spaced bearing rings concentric with said outer drum, oppositely disposed blades carried by said inner drum, longitudinally spaced rings secured to each blade, each ring of one blade being mounted on one of said bearing rings and being located adjacent a ring of the opposite blade, oppositely disposed slotted rods journaled in the cylindric shell of the inner drum, slots being formed in said cylindric shell opposite the slots in said rods, said blades projecting through the slots in said rods and in the shell and engaging the inner walls of the outer drum, and means for rotating the inner drum.

In testimony, that we claim the foregoing as our invention we affix our signatures in the presence of two witnesses, this 25th day of August A. D. 1909.

JOHN H. GOEHST.
JOHN A. DUNLAP.

Witnesses:
CLARENCE E. MEHLHOPE,
GEORGE R. WILKINS.